US010540715B2

(12) United States Patent
Jones et al.

(10) Patent No.: US 10,540,715 B2
(45) Date of Patent: Jan. 21, 2020

(54) AUTOMATED OPTIONS TRADING SYSTEM THAT GENERATES A FLATTENED TRADING SPREAD

(71) Applicant: TD Ameritrade IP Company, Inc., Omaha, NE (US)

(72) Inventors: Victor Anthony Jones, Omaha, NE (US); Arun Venkatesh, Omaha, NE (US)

(73) Assignee: TD Ameritrade IP Company, Inc., Omaha, NE (US)

(*) Notice: Subject to any disclaimer, the term of this patent is extended or adjusted under 35 U.S.C. 154(b) by 1013 days.

(21) Appl. No.: 14/101,011

(22) Filed: Dec. 9, 2013

(65) Prior Publication Data

US 2015/0032592 A1 Jan. 29, 2015

Related U.S. Application Data

(60) Provisional application No. 61/857,845, filed on Jul. 24, 2013.

(51) Int. Cl.
*G06Q 20/04* (2012.01)
*G06Q 40/04* (2012.01)

(52) U.S. Cl.
CPC .................. *G06Q 40/04* (2013.01)

(58) Field of Classification Search
CPC ........ G06Q 40/06; G06Q 40/04; G06Q 40/00; G06Q 40/02; G06Q 10/063112;
(Continued)

(56) References Cited

U.S. PATENT DOCUMENTS 5,819,237 A * 10/1998 Garman ................. G06Q 40/06
705/36 R
7,236,953 B1 * 6/2007 Cooper ................. G06Q 40/06
705/36 R
(Continued)

FOREIGN PATENT DOCUMENTS

WO WO-2006130650 A2 * 12/2006 ............. G06Q 40/00

OTHER PUBLICATIONS

Causic, Josip: Bear Call vs. Iron Condor, Jun. 5, 2012, Online Trading Academy, pp. 3-7.*
(Continued)

*Primary Examiner* — Bijendra K Shrestha
(74) *Attorney, Agent, or Firm* — Harness, Dickey & Pierce, P.L.C.

(57) ABSTRACT

Disclosed herein are system, method, and computer program product embodiments for generating a flattened trading spread. An embodiment operates by receiving one or more inputs indicating criteria for a potential trade including a stock, a predicted direction for the stock, a predicted duration for the predicted direction, a tolerable probability of success, and a tolerable percentage of potential loss from an account. A scan on the stock within the predicted duration is executed against a database containing real-time quotes and associated trading data. Results returned from the executing are processed to determine if each result accords with one or more strategies determined to meet the criteria. For each result determined from the processing to accord with a strategy, a flattened spread is calculated based on the criteria, the flattened spread comprising: a probability of success, a measure of return, and a measure of risk.

20 Claims, 5 Drawing Sheets

(58) Field of Classification Search
CPC .. G06Q 10/105; G06Q 50/01; G06F 3/04815; G06F 3/0482; G06F 3/0484
See application file for complete search history.

(56) References Cited

U.S. PATENT DOCUMENTS

| | | | | |
|---|---|---|---|---|
| 7,555,452 | B2* | 6/2009 | Van Lier | G06Q 40/00 705/35 |
| 7,848,992 | B2* | 12/2010 | Turner | G06Q 40/00 705/37 |
| 7,877,308 | B1* | 1/2011 | Padgette | G06Q 10/04 705/35 |
| 8,429,054 | B2* | 4/2013 | Krowas | G06Q 40/06 705/35 |
| 2001/0056391 | A1* | 12/2001 | Schultz | G06Q 30/0601 705/36 R |
| 2002/0156722 | A1* | 10/2002 | Greenwood | G06Q 40/06 705/37 |
| 2002/0174056 | A1* | 11/2002 | Sefein | G06Q 40/04 705/37 |
| 2002/0174058 | A1* | 11/2002 | Baghdady | G06Q 40/06 705/37 |
| 2002/0184134 | A1 | 12/2002 | Olsen et al. | |
| 2003/0088489 | A1* | 5/2003 | Peters | G06Q 40/06 705/36 R |
| 2005/0187855 | A1 | 8/2005 | Brennan et al. | |
| 2006/0031149 | A1* | 2/2006 | Lyons | G06Q 40/06 705/35 |
| 2006/0069635 | A1 | 3/2006 | Ram et al. | |
| 2006/0080212 | A1 | 4/2006 | Anderson et al. | |
| 2006/0129473 | A1* | 6/2006 | Hansen | G06Q 40/00 705/37 |
| 2007/0244788 | A1* | 10/2007 | Ferris | G06Q 40/06 705/36 R |
| 2007/0266788 | A1* | 11/2007 | Kim | G01M 5/0033 73/588 |
| 2009/0006271 | A1 | 1/2009 | Crowder | |
| 2010/0030699 | A1 | 2/2010 | Caputo et al. | |
| 2011/0320383 | A1* | 12/2011 | Chang | G06Q 40/06 705/36 R |
| 2013/0091072 | A1* | 4/2013 | Borkovec | G06Q 40/04 705/36 R |
| 2013/0287476 | A1 | 11/2013 | Hammond | |
| 2014/0046976 | A1* | 2/2014 | Zhang | G06F 17/30483 707/772 |

OTHER PUBLICATIONS

Shock, Andrew P.: Yield Curves Spread Trades: Opportunities & Applications, Jun. 2013, Curve Trades, pp. 1-12. (Year: 2013).*
Sheu et al.: Effective options trading strategies based on volatility forecasting recruiting investor sentiment, , 2011, Expert System with Applications, 38, pp. 585-596. (Year: 2011).*
Zallom, Caitlin: How to Read the Future: The Yield Curve, Affect, and Financial Prediction, 2009, pp. 1-24. (Year: 2009).*
Smith, Steve: Choosing the Right Options Spread Strategy, May 31, 2006, pp. 1-6. (Year: 2006).*
International Search Report dated Feb. 20, 2015, issued in International Application No. PCT/US14/37324.
*Orca Translates Your Market Idea Into Pro Option Strategies*, Orca webpage, retrieved from https://www.orca.trade/, 8 pages, Copyright 2015.
Cox, M., *Best Option Trading Announces the Launch and Release of Orca*, Press Release, Best Option Trading, 2 pages, Mar. 1, 2015.
*Orca Product Overview*, Best Option Trading, LLC, retrieved from www.orca.trade, 1 page, 2015.
*Tour OptionVue 7*, OptionVue Systems International, retrieved from http://www.optionvue.com/tour-optionvue7.html, 1 page, printed Dec. 18, 2015.
*OptionVue 7 Quotes Display*, OptionVue Systems International, retrieved from http://www.optionvue.com/tour-optionvue-quotes-display.html, 1 page, printed Dec. 18, 2015.
*OptionVue Matrix*, OptionVue Systems International, retrieved from http://www.optionvue.com/tour-optionvue-option-matrix.html, 2 pages, printed Dec. 18, 2015.
*OptionVue Graphic Analysis*, OptionVue Systems International, retrieved from http://www.optionvue.com/tour-optionvue-graphic-analysis.html, 2 pages, printed Dec. 18, 2015.
*OptionVue Graphic Trade Finder*, OptionVue Systems International, retrieved from http://www.optionvue.com/tour-optionvue-trade-finder.html, 1 page, printed Dec. 18, 2015.
*OptionVue Database Survey*, OptionVue Systems International, retrieved from http://www.optionvue.com/tour-optionvue-database-survey.html, 1 page, printed Dec. 18, 2015.
*OptionVue Volatility Charts*, OptionVue Systems International, retrieved from http://www.optionvue.com/tour-optionvue-volatility-charts.html, 1 page, printed Dec. 18, 2015.
*OptionVue 7 Portfolio Manager*, OptionVue Systems International, retrieved from http://www.optionvue.com/tour-optionvue-portfolio-manager.html, 1 page, printed Dec. 18, 2015.
*OptionVue 7 Backtrader*, OptionVue Systems International, retrieved from http://www.optionvue.com/tour-optionvue-backtrader.html, 1 page, printed Dec. 18, 2015.
Yates, L., *Trading the VXX—$2^{nd}$ Edition*, 9 pages, downloaded from http://www.optionvue.com/files/Trading_the_VXX.pdf, available as early as Apr. 7, 2014.
*Yahoo! Optionetics Option Trade Finder*, Optionetics, Inc., retrieved from http://yahoo.optionetics.com/yhmain.htm, 1 page, printed Dec. 18, 2015, Copyright 1995-2012.
*Live Trade—Online Education—Optionetics*, Optionetics, Inc., retrieved from http://www.optionetics.com/products/livetrade/, 2 pages, printed Dec. 21, 2015, Copyright 1995-2015.
*Optionetics LiveTrade Flyer*, Optionetics, Inc., downloaded from http://www.optionetics.com/pdf/flyers/livetrade.pdf, 2 pages, Copyright 2011.
*Platinum—Options Analysis—Optionetics*, Optionetics, Inc., retrieved from http://www.optionetics.com/products/platinum/, 2 pages, printed Dec. 21, 2015, Copyright 1995-2015.
*Platinum Essentials Flyer*, Optionetics, Inc., downloaded from http://www.optionetics.com/pdf/flyers/platinum_essentials.pdf, 2 pages, Copyright 2011.
*Profit Source: Financial Market Analysis Software—Optionetics*, Optionetics, Inc., retrieved from http://www.optionetics.com/products/profitsource/, 2 pages, printed Dec. 21, 2015, Copyright 1995-2015.
*ProfitSource Flyer*, Optionetics, Inc., downloaded from http://www.optionetics.com/pdf/flyers/PDF_ProfitSource.pdf, 2 pages, Copyright 2012.
*Option Strategy Finder | The Options & Futures Guide*, TheOptionsGuide.com. retrieved from http://www.theoptionsguide.com/option-trading-strategies.aspx, 2 pages, printed Dec. 21, 2015, Copyright 2009.

* cited by examiner

AUTOMATED OPTIONS TRADING SYSTEM THAT GENERATES A FLATTENED TRADING SPREAD

CROSS-REFERENCE TO RELATED APPLICATIONS

This application claims benefit to U.S. Provisional Application No. 61/857,845, filed Jul. 24, 2013 which is incorporated by reference in its entirety herein.

BACKGROUND

Trading options can be an intimidating and complicated process for the average investor. For example, in the process of trading options the average investor may be asked to make costly decisions based on variables they do not understand, described in terms of financial jargon, complex models, or other concepts that are not intuitive or accessible to the average investor. Also, as market data changes in real-time, so too do the dynamics of options trading. Without having access to the right tools in addition to current financial data for analyzing the options market, trading may be a costly process of trial and error.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

An option is a contract giving its owner the right to buy or sell an underlying asset or instrument at a specific strike price on, or before, a specific date. As a result, the seller of an option incurs an obligation to fulfill the transaction if the holder decides to exercise the option prior to its expiration. Distinct from the concept of options trading are the tools for analyzing and/or executing trades. Because of the amount and complexity of financial information generated by large-scale, dynamic processing and computational analysis of market data, e.g., using probabilistic models, statistical models, etc., tools for analyzing and/or executing trades must be able to do what a person cannot: monitor, store, process, transform, and/or display correct outputs that reflect the modeling of potentially hundreds of variables which are in turn calculated, sorted, filtered, and/or displayed on the fly.

In this context, system, method and/or computer program product embodiments, and/or combinations and sub-combinations thereof, are provided herein for generating a flattened trading spread. Example embodiments provide a trading platform configured to transform and/or filter dynamic market data derived from, for example, quote and option-chain detail sources, based on criteria input by a user to generate a flattened spread, the flattened spread comprising: a probability of success, a measure of return, and a measure of risk. In an example embodiment, a user is provided with a series of narrative questions to elicit inputs. The combination of inputs provided by the user is transformed into a set of criteria used to filter for one or more options strategies. Of the strategies determined to meet the criteria, variables associated with applying each eligible option strategy may be dynamically processed to calculate probability of success, measure of return, and measure of risk for each spread. Spreads may be listed in order of one or more of the measures. A user interface may be provided to receive initial inputs from the user as well as to display processed output in a manner that provides context, for example, to aid in the user's trade decision-making process. A trade executor component may also be provided to enable the user to act on one or more of the displayed spreads. One of skill in the relevant art(s) will appreciate that system, method and/or computer program product embodiments described herein, while described in terms of options trading, may be readily adapted to pair-trades, stocks or futures, and/or other types of financial instruments.

Figure 1:
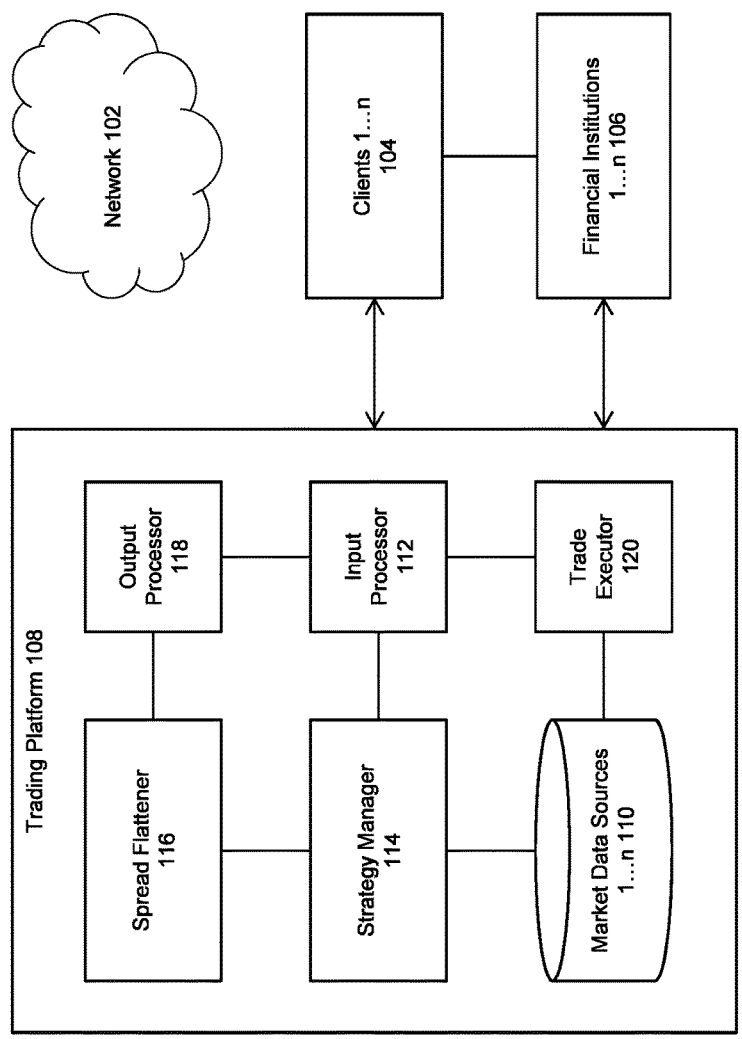
FIG. 1 is a block diagram of an example system architecture including a trading platform, according to an example embodiment.

FIG. 1 shows an example system architecture 100 useful for generating a flattened trading spread. System architecture 100 includes a trading platform 108 connected to one or more clients 1 . . . n 104 and one or more financial institutions 1 . . . n 106. As shown in FIG. 1, trading platform 108 may be connected to clients 104 and/or financial institutions 106 over a network 102. Network 102 may include one or more networks of one or more network types, including any combination of LAN, WAN, the Internet, etc. Network 102 may encompass connections between any or all components in system architecture 100, for example, as between components of trading platform 108, such as, for example, one or more market data sources 1 . . . n 110. Market data sources 110 may include any source of data related to financial markets. Data related to financial markets includes but is not limited to quotes and option-chain details based, for example, on end-of-day, intra-day, real-time, low or ultra-low latency data sources and/or services that provide direct and/or consolidated market data. One of skill in the relevant art(s) would understand that sources of market data may be made available remotely and/or by services that track financial data across markets, asset classes, and financial instruments (e.g., equities, derivatives, commodities, fixed income, foreign exchange). Moreover, such sources may provide data in various forms, types, reporting methods, terms, benchmarks, standard data points (e.g., quotes, prices, fundamentals, earnings estimates, analyst ratings, statistics, etc.).

In an example embodiment, financial institutions 106 include one or more public or private institutions that collect, manage, and/or store funds, for example, in accounts containing funds. Financial institutions 106 may participate directly or indirectly in the investment of financial assets. Financial institutions 106 may host and/or provide access to data about accounts including, but not limited to, an amount of available funds, account balances, credit, buying power, account value etc. Financial institutions 106 may manage one or more databases containing financial information regarding their customers, which may include one or more users of trading platform 108. Moreover, a user operating client 104 may interact with one or more financial institutions 106 over network 102 to manage an account and/or investment. A client 104 may interact with financial institutions 106 by interacting with trading platform 108, as shown in FIG. 1. For example, while interacting with trading platform 108 a user of client 104 may access, change, and/or manage account related data controlled by financial institutions 106. A person having skill in the relevant art(s) would understand that methods and standards for securing financial data are known and can be implemented using various information security techniques and policies, e.g., username/password, Transport Layer Security (TLS), Secure Sockets Layer (SSL), and/or other cryptographic protocols providing communication security.

In an example embodiment, system architecture 100 operates as a service-oriented architecture and uses a client-server model that would be understood by one of skill in the relevant art(s) to enable various forms of interaction and communication between clients 104, trading platform 108, and/or financial institutions 106. System architecture 100 may be distributed over various types of networks 102 and/or may operate as cloud computing architecture. Cloud computing architecture may include any type of distributed network architecture. By way of example not of limitation, cloud computing architecture is useful for providing software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), API as a service (APIaaS), integration platform as a service (IPaaS) etc.

In an example embodiment, client 104 includes a computer, device, interface, etc. or any sub-system thereof. Client 104 includes but is not limited to a personal computer, mobile device, smart device, tablet, television, or other computing device. Client 104 may include an operating system (OS), applications installed to perform various functions such as, for example, browsing and/or navigation of data made accessible locally, in memory, and/or over network 102. Client 104 may include a web browser. A browser may display information, support web-applications, operate services, and/or process inputs received by client 104 from user interaction with various components of client 104. Client 104 may include one or more native applications that may operate independently of a browser.

By way of example not limitation, client 104 is a mobile device connected over network 102 to a store. Client 104 may download one or more applications to the mobile operating system of client 104 from the store. Such an application may in turn orchestrate and/or manage access to network 102 such that data, e.g., from market data sources 110, may be obtained in real-time, routinely, upon a request or input by a user, and/or when a notification is received to collect updated data.

Figure 2:
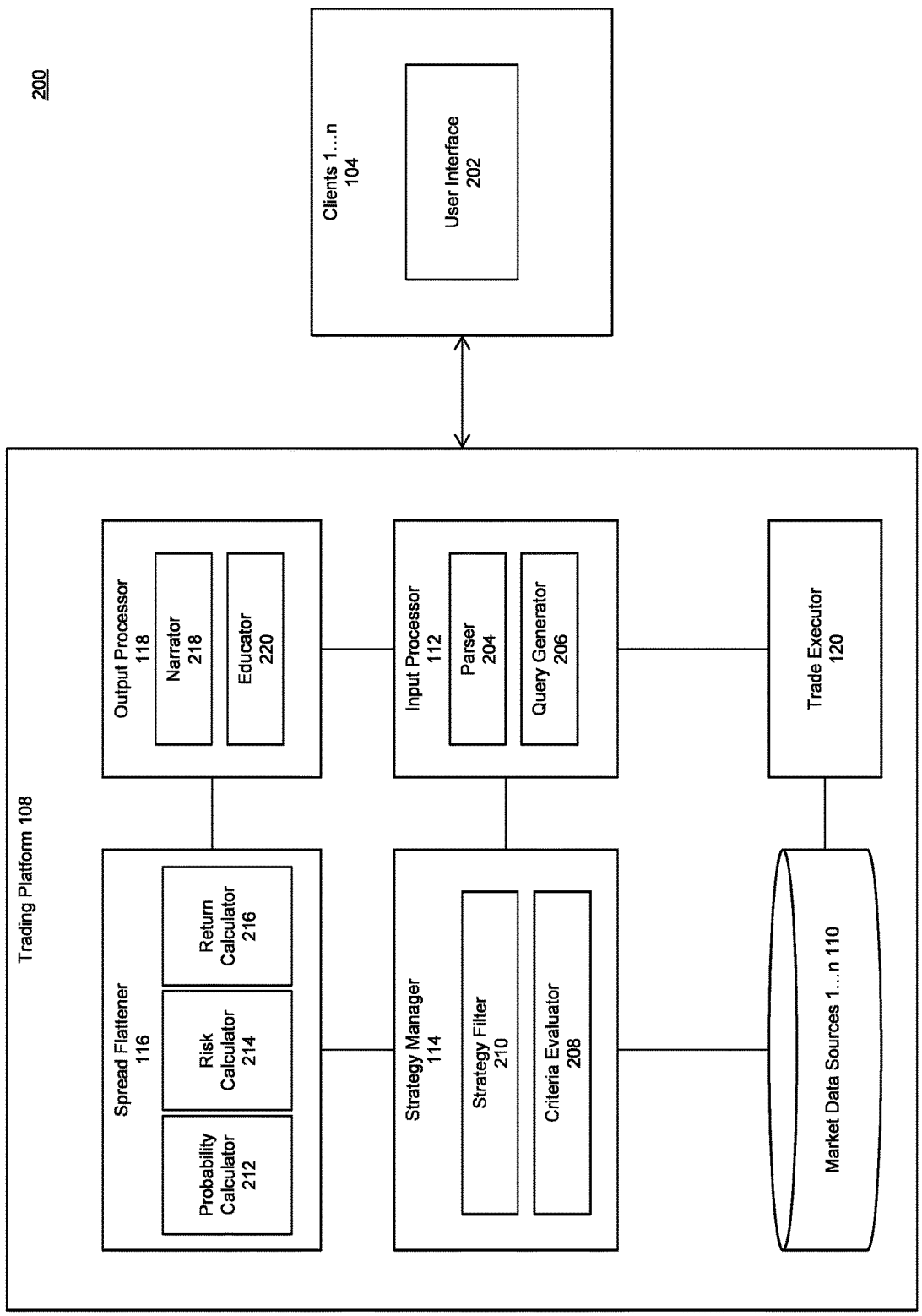
FIG. 2 is an expanded block diagram of a trading platform, according to an example embodiment.

In an example embodiment, trading platform 108 includes one or more of an input processor 112, a strategy manager 114, a spread flattener 116, an output processor 118, and a trade executor 120. An expanded view of trading platform 108 as well as client 104 is shown in FIG. 2. Input processor 112 receives and processes inputs from clients 104 and/or financial institutions 106. Processing is performed by a parser 204. Processing may include but is not limited to operations such as parsing, transcoding, translating, adapting, or otherwise handling any input received from client 104 and/or financial institutions 106. Inputs may be received via one or more input elements displaying in a user interface 202 provided on client 104 and/or by a stream, feed, database, or other source of data, such as may be made accessible by financial institutions 106, for example, over network 102.

In an example embodiment, input processor 112 includes a query generator 206. Query generator 206 processes inputs and transform the contents into query syntax and/or structured query language (SQL) which in turn may be used to query market data sources 110 and/or other databases or data sources. For example, a user operating user interface 202 may enter a stock symbol. Upon receiving the input, query generator 206 generates a query formulated to return, for example, a quotation statement and/or a price chart for the stock represented by the symbol. Additional criteria may be included to adjust the query.

In an example embodiment, input processor 112 is connected to strategy manager 114. Strategy manager 114 is configured to receive the inputs passed from input processor 112 in a form ready to be processed in accordance with strategies for trading options that are represented as financial models and/or algorithms. Such models and/or algorithms may be used to generate probabilities, for example, based on dynamic, real-time, and/or historical market data, performance measures, statistics, or other indicators. Data used to derive and populate such options strategy models and/or algorithms are available to strategy manager 114 via, for example, market data sources 110. Strategy manager 114 may be configured to formulate queries based on, for example, the variables required to populate its models and/or algorithms. Models and/or algorithms once populated may be used to generate one or more measures related to options trading which provide indicators useful for analyzing option spreads. One having skill in the relevant art(s) would understand that the financial models and/or algorithms which provide one or more option trading strategies are known and may be adjusted in accordance with new methods of evaluating and analyzing options markets. As such, the variables included therein are flexible. Such models and algorithms may be made available to strategy manager 114 as services and/or resources that may be managed, generated, and/or supplied independently of trading platform 108.

In an example embodiment, strategy manager 114 includes a criteria evaluator 208. Criteria evaluator 208 may be configured to receive inputs processed by parser 204. Criteria evaluator 208 may transform such inputs into variables used to refine the number of options strategies, represented as models, and/or algorithms applied to inputs provided by a user. For example, if input received indicates that a user believes a particular stock will go down, e.g., rather than up or remain neutral, criteria evaluator 208 limits scanning criteria on market data sources 110 to bear calls for vertical spreads. Based on the criteria processed by criteria evaluator 208, strategy manager 114 may use a strategy filter 210 to limit results returned from the scan to results that are in accordance with the criteria.

In an example embodiment, strategy manager 114 is connected to spread flattener 116. Spread flattener 116 includes a probability calculator 212, a risk calculator 214, and a return calculator 216, each configured to produce a measure of their respective variables corresponding to a probability of success, a measure of risk, and a measure of return for a result produced by strategy manager 114.

In an example embodiment, probability of success may be defined as a measure of real risk divided by total risk. Total risk may be defined as the absolute value difference between the width of a spread times a known multiplier. Real risk may be defined as total risk minus a credit received. The measure of risk may be defined as real risk times a quantity factor. The quantity factor may be defined as a potential investment divided by real risk. The potential investment may be defined as the dollar amount a user is willing to lose. The measure of reward may be defined as credit received times the quantity factor. Credit received may be defined as market value of the spread times a known multiplier.

In an example embodiment, strategy manager 114, through operation of its models and/or algorithms in concert with criteria evaluator 208 and strategy filter 210, provides variables to spread flattener 116 which takes the variables and generates output reflecting, for example, summary measures of probability, risk, and return for each result. Flattening of the spread in this manner reduces the number of variables exposed by strategy manager 114 to a probability of success, a measure of risk, and a measure of return for each result produced by strategy manager 114. By way of a non-limiting example, an "iron condor" represents an options strategy that has a bear and a bull spread where strike prices on the short call and the short put are different. In processing criteria in accordance with the iron condor strategy, spread flattener 116 takes the at-the-money bear call spread and pairs it with the at-the-money bull put spread, generating an iron butterfly. A first calculation is performed to derive a first probability of success. The short strike of the bear call spread is then moved one striker higher and paired with the long call of the next (higher) strike. Once moved, the short strike of the bull put spread is moved one strike lower and paired with the long call spread of the next (lower) strike. A second calculation is performed to derive a second probability of success. Spread flattener 116 then checks that the width of strikes is equidistant. One or more of the steps indicated may be continued until a series is complete. A person of skill in the relevant art(s) would understand that other techniques for calculating measures of probability, risk, and return for options spreads are possible and also that an iron condor is one of numerous options strategies that may be represented in models and/or algorithms available to strategy manager 114.

In an example embodiment, spread flattener 116 is connected to output processor 118. Spread flattener 116 may include a narrator 218 and an educator 220. The flattened spread for each result may be processed by narrator 218 such that contextual information for each measure, e.g., a description for probability of success, may be associated with the result. To enhance the educational value of such contextual information, an educator 220 may provide supporting definitions and/or related narrative description, thereby providing deeper navigation options for a user seeking to learn about, for example, the complexities of options trading. By way of a non-limiting example, as narrator 218 provides contextual information alongside an output measure in user interface 202, educator 220 may include, for example, one or more links which, when selected, may display additional explanation of the output measure and/or underlying variables. Educator 220 may comprise a database which indexes concepts, a knowledge-base, and/or other resource for associating elements displayed on user interface 202 with terms, keywords, and/or concepts. Educator 220 may also provide information directing users to guidance and/or customer support.

Figure 3:
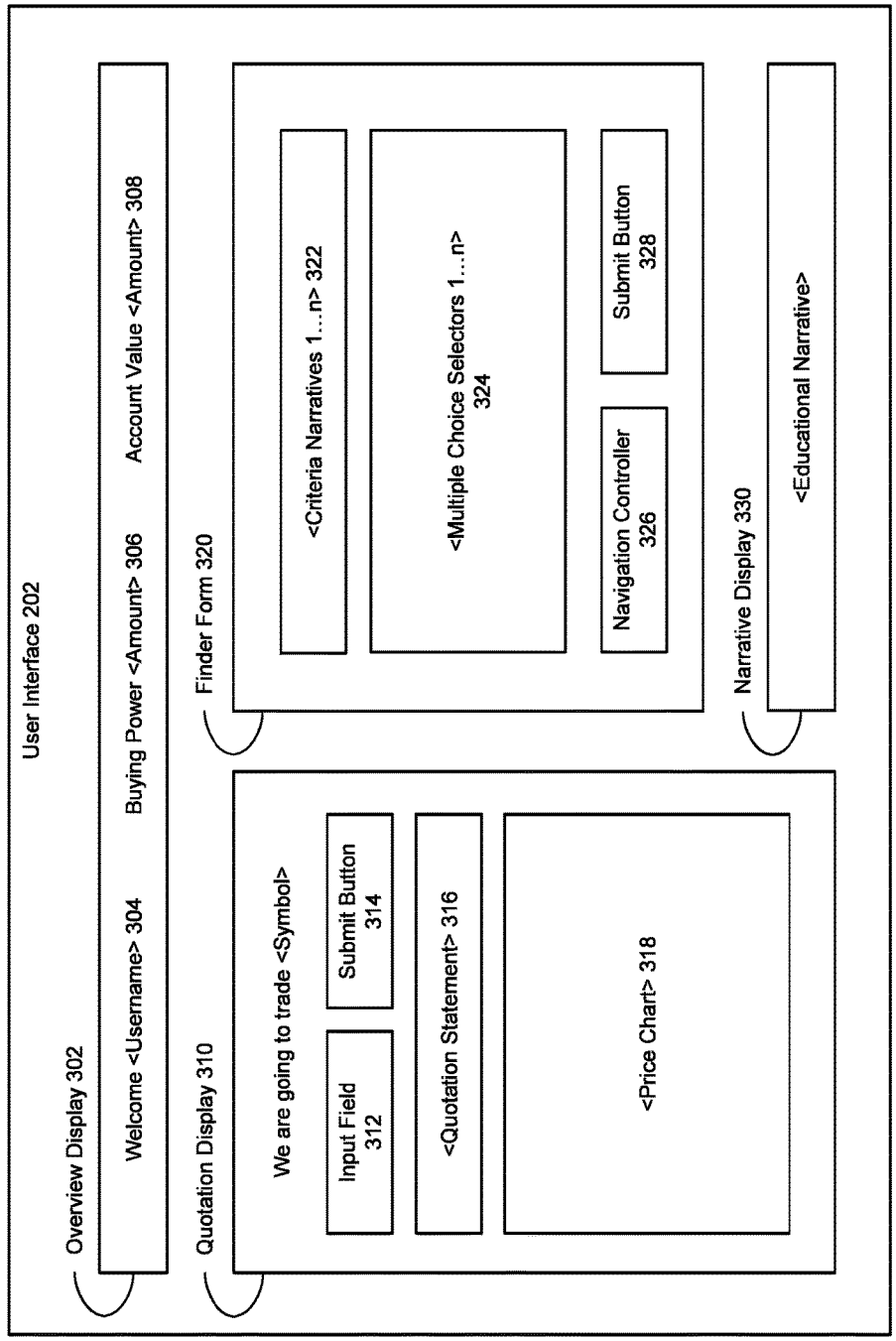
FIG. 3 is a diagram of a user interface, according to an example embodiment.

FIG. 3 shows an example view of user interface 202 as may be displayed to a user of client 104, for example, in a browser in a webpage, in a browser operating as a web-application, in a browser operating as a plugin, and/or as a native application running, for example, on an operating system of a device (e.g., computer, mobile device, tablet).

User interface 202 may be implemented as an extension of service oriented architecture (SOA), thereby enabling a single implementation of user interface 202, and/or variations thereof, to display properly on various platforms, applications, and devices potentially represented by clients 104. One having skill in the relevant art(s) would understand that the layout of user interface 202 shown for purposes of illustration in FIG. 3 may be adapted through methods such as transcoding, e.g., to other formats, display protocols, mark-up languages, suitable for displaying user interface 202 on various device types with various limitations and/or capabilities, enabling improved display of user interface 202. For example, not all the user interface components need to be displayed in a single screen and may be divided and/or sub-divided into multiple screen sections, shown in a sequence, and/or shown each on its own. One having skill in the relevant art(s) would understand that various methods of user interface data binding methods may be used to enable the functionality associated with user interface 202, e.g., following an application domain model. Such methods may include techniques for providing input validation and/or data type mapping.

In an example embodiment, user interface 202 includes an overview display 302 as well as various other display elements that may be populated with live data from one or more sources available on system architecture 100, e.g., one or more cookies stored by a browser associated with client 104, locally on client 104, database associated with trading platform 108, database maintained by financial institution 106, etc. Overview display 302 may include a welcome <username> element 304 configured to display a name associated with the user and may include a statement of encouragement such as, for example, "Let's make some money!" Overview display 302 includes a buying power <amount> 306 that indicates a measure of buying power that may be displayed in terms of currency and/or an account value <amount> 308 displayed in terms of currency.

In an example embodiment, user interface 202 includes a quotation display 310. A symbol entry screen may provide a place for the user to enter a stock symbol as shown by an input field 312 and a submit button 314. A header may ask, "What stock do you want to trade <Username>?" Upon symbol entry and submission a request is provided to input processor 204, parser 204, and query generator 206 to retrieve the requested information. Once retrieved and provided, quotation display 310 displays a <quotation statement> 316. Quote data displayed as <quotation statement> 316 may be last price, net change, and/or percentage change etc. The data may be presented in human readable syntax by the aid of narrator 218. For example, quote data is retrieved and then processed by output processor 118 and the data may be displayed in a narrative form, e.g., "ABC is trading at $427.72. It is down $4.27 (−0.99%) today." A <price chart> 318 may be displayed. <Price chart> 318 may include a price representation over a default and/or adjustable timeline that reflects trading activity of <symbol>. The header may transition to display "We are going to trade <symbol>!" Data displayed in quotation display 310 may be real-time data retrieved from one or more of market data sources 1 . . . n 110 or may be retrieved from other sources.

In an example embodiment, user interface 202 includes a finder form 320. Finder form 320 presents a series of questions to the user. Finder form 320 displays the questions in <criteria narratives 1 . . . n> 322 and corresponding <multiple choice selectors 1 . . . n> 324, wherein the user may indicate and provide answers to each of the questions. In an example embodiment, a sequence of questions posed by <criteria narratives 1 . . . n> 322 is provided to a user in finder form 320. By way of example not of limitation, questions for <criteria narratives> 322, answer choices for <multiple choice selectors> 324, and a result action to occur on trading platform 108 in parentheses are shown for illustrative purposes:

1. What direction do you think <symbol> is going?
   i. Up (scan for bull put vertical spreads)
   ii. Down (scan for bear call vertical spreads)
   iii. Neutral (scan for iron condors)
2. How long do you think it will take the stock to trade <1.A/B/C input?
   i. One week (scan for series with days to expiry closest to 5)
   ii. On month (scan for series with days to expiry closest to 30)
   iii. Three months (scan for series with days to expiry closest to 90)
3. What probability of success would you like your trade to have?
   i. Below 40% (scan in the series for 15-39%)
      (narrator 218 add "less probable, more return")
   ii. Around 50% (scan in the series for 40-60%)
      (narrator 218 add "coin flip, moderate return")
   iii. Above 60% (scan in the series for 61-90%)
      (narrator 218 add "more probable, less return")
4. How much of your account are you will to lose on your trade?
   i. 1% (calculate real risk based on 1% account value)
      (narrator 218 add "$<amount>, conservative")
   ii. 5% (calculate real risk based on 5% account value)
      (narrator 218 add "$<amount>, moderate")
   iii. 10% (calculate real risk based on 10% account value)
      (narrator 218 add "$<amount>, aggressive")

In example embodiment, a navigation controller 326 and a submit button 328 may be displayed to a user to enable navigation among different questions, for example, if they are shown in a sequence. Submit button 328 is selected to indicate that finder form 320 is complete, inputs have been entered, and the contents are ready to be processed by trading platform 208. Such submission may result in a data structure being transmitted to trading platform 208 to be processed, for example, by input processor 112 as described. If a user seeks to modify <multiple choice selectors> 324, navigation controller 326 may allow the user to edit the criteria and submit button 328 may appear for subsequent submissions.

In an example embodiment, receipt of the output from trading platform 108 causes finder form 320 to display a message to the user stating "Good news <Username>, there are <x> trades that match your criteria!" or "Bad news <Username>, we did not find any trades that meet your criteria. Please adjust your criteria or try another stock."

In an example embodiment, if the number of trades found is greater than zero then user interface 202 may display each trade as a single entry in a list, each entry displaying one or more of items of information including, but not limited to, a probability of success, measure of return, measure of risk, optimal position, and days to expiration. For example, information about optimal position and days to expiration may be processed by narrator 218 to be displayed in on or more formats depending on, for example, the type of spread, and/or strategy involved. By way of a non-limiting example, a bull put spread format may state "if above $<short strike> in <x> days," a bear call spread format may state "if below $<short strike> in <x> days," and an iron condor "if between $<short put strike> and $<short call strike> in <x> days."

One having skill in the relevant art(s) would understand that the format or context may be adapted to a full range of options trading strategies. The list of trades may be sorted by any of the items of information by the user. In an example embodiment, by default the list of trades is by sorted in order of probability of success. In an example embodiment, each entry in the list of trades includes an input element that is configured to launch trade executor 120. Upon selection of an input element associated with a given trade in the list of trades, a confirmation screen may appear which provides a detailed overview of the trade along with a narrative description of potential outcomes.

By way of a non-limiting example, upon user selection, focus may be given to the particular trade selected and narrator 218 may generate a customized message such as, for example: "You have selected the <x>|<x> <description> Spread. It is great if <symbol> is above $<amount>, in which case, you will profit $<amount>. It is good if <symbol> is between $<amount> and $<amount>, in which case, you will profit between $<amount> and $<amount>. And It is bad if <symbol> is below $<amount>, in which case, you will lose between $<amount> and $<amount>. A button, such as navigation controller 326, is displayed that enables a user to navigate back to the full list of trades. A button providing an opportunity to "Place this Trade!" may be displayed. Trade executor 120 receives the input indicating the user's selection to place the trade. Trade executor 120 may provide a separate or integrated interface for guiding the user through placement of the trade.

In an example embodiment, where opportunities to provide contextual information are identified, educator 220 may provide narrative explanation and/or display one or more links to resources available to the user in a narrative display 330. Educator 220 may store and provide audio and/or visual explanations of topics on, for example, options trading. In an example embodiment, educator 220 provides an assistant configured to educate a user on various aspects of options trading. Such an assistant may include an interactive display comprising a user interface configured to receive inputs and/or process triggers based on user interaction with trading platform 108. Such an assistant may respond to inputs with a narrative explanation and/or links to related resources using audio and/or visual responses to the user. Such an assistant may provide narrative answers to questions based on context and/or based on specific questions entered and submitted using an input form element.

In an example embodiment, upon placement of the trade buying power <amount> 306 is decremented by the measure of risk associated with the trade.

Figure 4:
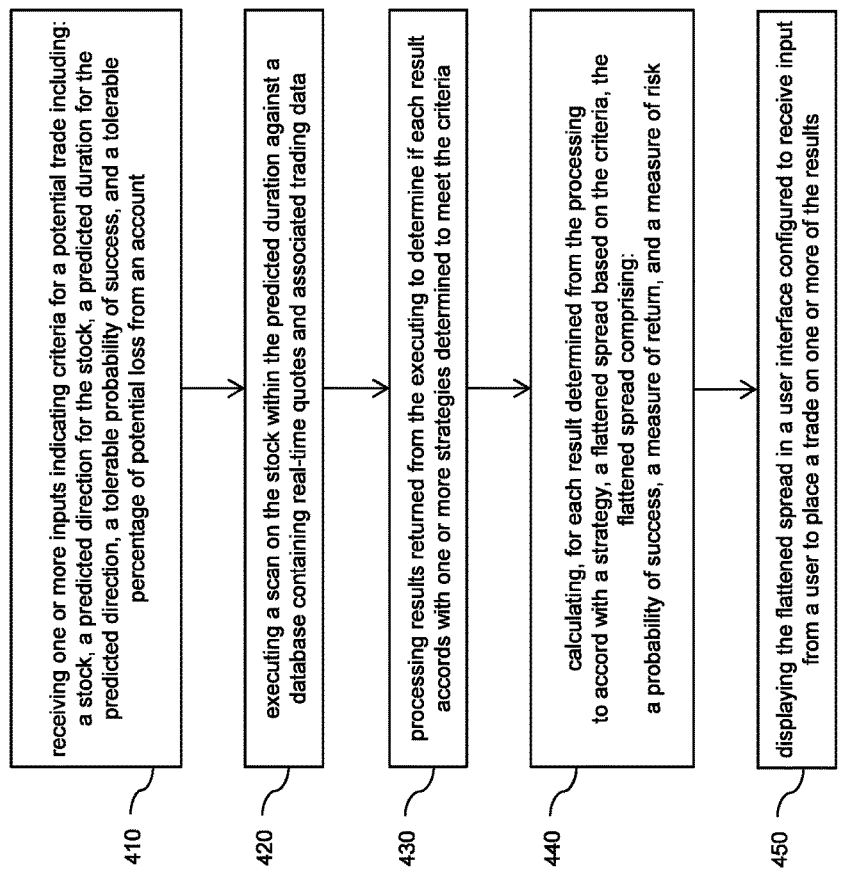
FIG. 4 is a flowchart illustrating a process for generating a flattened trading spread, according to an example embodiment.

FIG. 4 is a flow diagram showing a method for generating a flattened spread, according to an example embodiment.

In an example embodiment, method 400 begins at step 410, where one or more inputs indicating criteria for a potential trade are received including: a stock, a predicted direction for the stock, a predicted duration for the predicted direction, a tolerable probability of success, and a tolerable percentage of potential loss from an account. As shown in FIG. 3, a symbol entry screen may provide a place for the user to enter a stock symbol using input field 312 and submit button 314. Finder form 320 presents a series of questions to the user. Finder form 320 displays the questions in <criteria narratives 1 . . . n> 322 and corresponding <multiple choice selectors 1 . . . n> 324, wherein the user may indicate and provide answers to each of the following questions: 1. "What direction do you think <symbol> is going?" 2. "How long do you think it will take the stock to trade <up/down/neutral>?" 3. "What probability of success would you like your trade to have?" and 4. "How much of your account are you will to lose on your trade?" These questions for <criteria narratives> 322 have corresponding input fields which reflect answer choices <multiple choice selectors> 324 which may be selected by a user.

In an example embodiment, in step 420, a scan is executed on the stock within the predicted duration against a database containing real-time quotes and associated trading data. Input processor 112 is connected to strategy manager 114. Strategy manager 114 is configured to receive the inputs passed from input processor 112 in a form ready to be processed in accordance with strategies for trading options. Data used to derive and populate such options strategy models and/or algorithms are available to strategy manager 114 via, for example, market data sources 110. Criteria evaluator 208 receives inputs processed by parser 204. Criteria evaluator 208 transforms such inputs into variables used to scan market data sources 110. Based on the criteria processed by criteria evaluator 208, strategy manager 114 scans for the stock on market data sources 110.

In an example embodiment, user interface 202 is displayed and may be configured to receive the inputs indicating criteria by presenting a series of <criteria narratives 1 ... n> 322 and a corresponding series of <multiple choice selectors 1 ... n> 324 to a user. Context may be generated by narrator 218 and/or educator 220 and associated with each element.

In an example embodiment, in step 430, results returned from the executing to are processed to determine if each result accords with one or more strategies determined to meet the criteria. Based on criteria processed by criteria evaluator 208, strategy manager 114 may use a strategy filter 210 to limit results returned from the scan to results that are in accordance with the criteria. Strategy filter 210 determines if the one or more options strategies represented in a repository of models and/or algorithms aligns with criteria for a particular user's input. Criteria processed by criteria evaluator 208 may limit the operable options strategies to those which are aligned with the criteria entered by a user. In an example embodiment, determining if an options strategy that aligns with the criteria may be based on the user's input of whether the predicted direction for the stock corresponds to a bull put vertical spread, a bear call vertical spread, or an iron condor.

In an example embodiment, in step 440, for each trade result determined from the processing to accord with a strategy, a flattened spread based on the criteria is calculated, the flattened spread including a probability of success, a measure of return, and a measure of risk. Spread flattener 116 includes probability calculator 212, risk calculator 214, and return calculator 216, each configured to produce a measure of their respective variables corresponding to a probability of success, a measure of risk, and a measure of return for a result produced by strategy manager 114. Strategy manager 114, through operation of its models and/or algorithms, in concert with criteria evaluator 208 and strategy filter 210, provides variables to spread flattener 116 which takes the variables and generates output reflecting, for example, summary measures of probability, risk, and return for each result.

In an example embodiment, probability of success is determined by dividing a measure of real risk by a measure of total risk, the measure of total risk comprising an absolute value based on a width of a spread and a multiplier, and the measure of real risk comprising total risk minus a measure of credit received, wherein the measure of credit received is based on a market value of the spread.

In an example embodiment, measure of return is determined based on a measure of credit received multiplied by a quantity factor, the measure of credit received being based on a market value of a spread, and the quantity factor comprising a dollar amount associated with the tolerable percentage of potential loss divided by a measure of real risk, the measure of real risk comprising a measure of total risk minus the measure of credit received, wherein the measure of total risk comprises an absolute value based on a width of a spread and a multiplier.

In an example embodiment, measure of risk is determined based on a measure of real risk multiplied by a quantity factor, the quantity factor comprising a dollar amount associated with the tolerable percentage of potential loss divided by the measure of real risk, the measure of real risk comprising a measure of total risk minus a measure of credit received, the measure of total risk comprising an absolute value based on a width of a spread and a multiplier, and the measure of credit received being based on a market value of a spread. Flattening of the spread in this manner reduces the number of variables exposed by strategy manager 114 to a probability of success, a measure of risk, and a measure of return for each result produced by strategy manager 114.

In an example embodiment, in step 440, the flattened spread is displayed in a user interface configured to receive input from a user to place a trade on one or more of the results. If the number of trades found is greater than zero then user interface 202 may display each trade as a single entry in a list.

In an example embodiment, each entry in the list of trades displayed includes an input element that is configured to launch trade executor 120. Upon selection of an input element associated with a given trade in the list of trades, a confirmation screen may appear which provides a detailed overview of the trade along with a narrative description of potential outcomes. A button, such as navigation controller 326, is displayed that enables a user to navigate back to the full list of trades. A button providing an opportunity to "Place this Trade!" may be displayed. Trade executor 120 receives the input indicating the user's selection to place the trade. Trade executor 120 may provide a separate or integrated interface for guiding the user through placement of the trade.

Example Computer System

Figure 5:
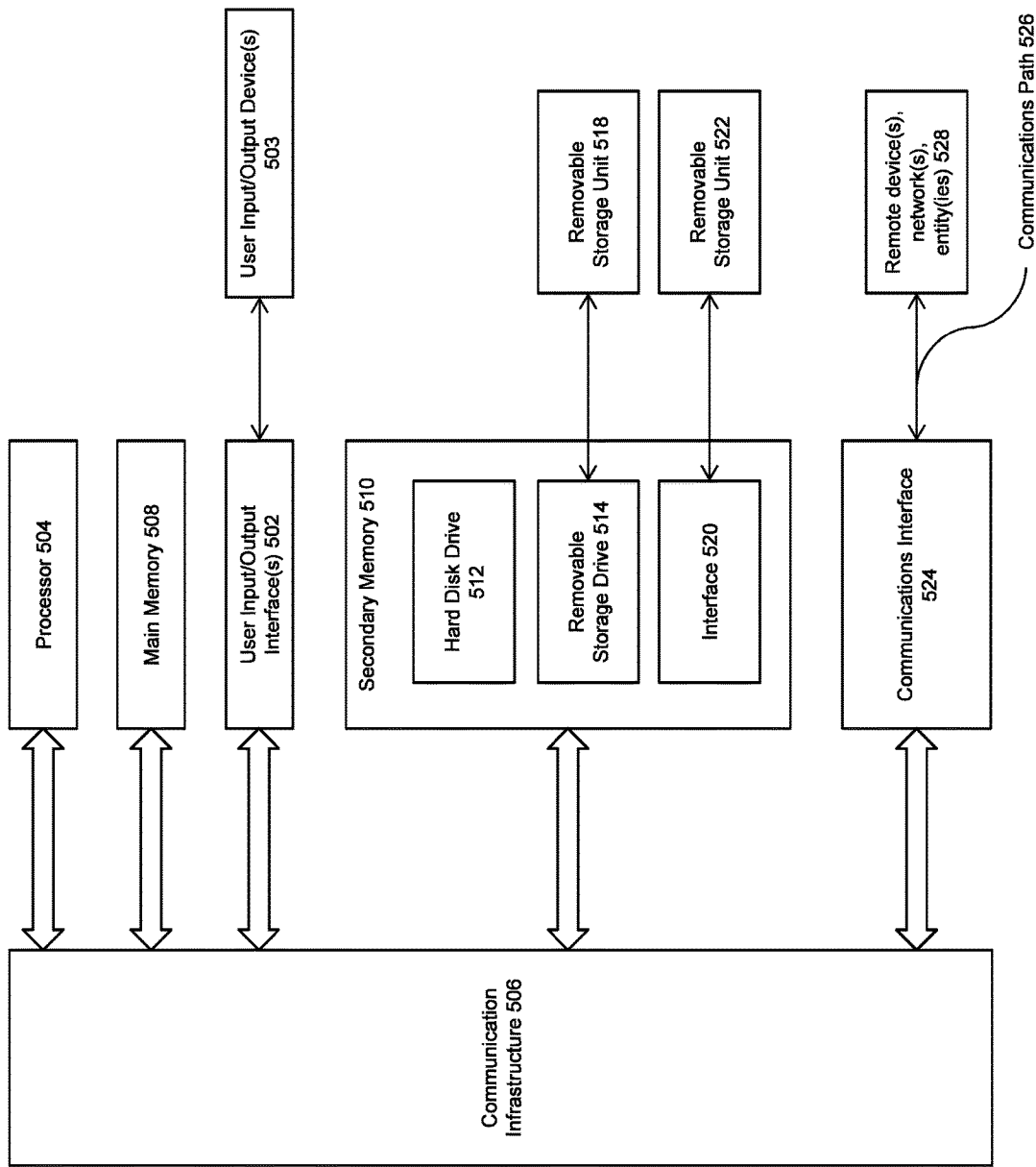
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for generating a flattened spread, the method comprising:
    providing, by a processor, one or more narrative questions;
    receiving, by the processor, one or more inputs in response to the one or more narrative questions, wherein the one or more inputs indicate criteria for a potential trade including: a stock, a predicted direction for the stock, a predicted duration for the predicted direction, a tolerable probability of success, and a tolerable percentage of potential loss from an account;
    transforming, by the processor, the one or more inputs into a set of criteria formatted into a query syntax or a structured query language;
    executing, by the processor, a scan on the stock within the predicted duration against a database containing real-time quotes and associated trading data to generate a plurality of results;
    obtaining, by the processor, a list of a plurality of descriptions of trading strategies;
    filtering, by the processor, the list of the plurality of descriptions of trading strategies using the set of criteria resulting in one or more filtered strategies;
    determining, by the processor, whether each result of the plurality of results accords with the one or more filtered strategies;

for each result that accords with the one or more filtered strategies, calculating, by the processor, based on the criteria, a probability of success, a measure of return, and a measure of risk;

generating, by the processor, the flattened spread reflecting the probability of success, the measure of return, and the measure of risk;

displaying, by the processor, the flattened spread on a user interface;

generating, by the processor, one or more links based on the displayed flattened spread; and providing, by the processor, the one or more links on the user interface, wherein, for each link of the one or more links, selection of the link by a user launches audio or visual explanations of the flattened spread.

2. The method of claim 1, further comprising:

receiving, via the user interface, a trade input from the user related to a selected result of the plurality of results; and initiating a trade on the selected result in accordance with the trade input.

3. The method of claim 1, further comprising:

displaying, on the user interface, a series of selectable options to the user, wherein the one or more inputs are received as responses to the series of selectable options; and displaying, for each selectable option of the series of selectable options, one or more questions with multiple choice answers providing narrative context.

4. The method of claim 1, further comprising:

identifying a trading strategy from the plurality of descriptions of trading strategies based on whether the predicted direction for the stock corresponds to a bull put vertical spread, a bear call vertical spread, or an iron condor.

5. The method of claim 1, wherein:

the calculating includes calculating the probability of success by dividing a measure of real risk by a measure of total risk, the measure of total risk includes an absolute value based on a width of a spread and a multiplier, the measure of real risk includes total risk minus a measure of credit received, and the measure of credit received is based on a market value of the spread.

6. The method of claim 1, wherein:

the calculating includes calculating the measure of return based on a measure of credit received multiplied by a quantity factor, the measure of credit received is based on a market value of a spread, the quantity factor includes a dollar amount associated with the tolerable percentage of potential loss divided by a measure of real risk, the measure of real risk includes a measure of total risk minus the measure of credit received, and the measure of total risk includes an absolute value based on a width of a spread and a multiplier.

7. The method of claim 1, wherein:

the calculating includes calculating the measure of risk based on a measure of real risk multiplied by a quantity factor, the quantity factor includes a dollar amount associated with the tolerable percentage of potential loss divided by the measure of real risk, the measure of real risk includes a measure of total risk minus a measure of credit received, the measure of total risk includes an absolute value based on a width of a spread and a multiplier, and the measure of credit received is based on a market value of a spread.

8. A system, comprising:

a memory; and at least one processor coupled to the memory, wherein the memory stores instructions that, upon execution, cause the at least one processor to:

provide one or more narrative questions;

receive one or more inputs in response to the one or more narrative questions, wherein the one or more inputs indicate criteria for a potential trade including: a stock, a predicted direction for the stock, a predicted duration for the predicted direction, a tolerable probability of success, and a tolerable percentage of potential loss from an account;

transform the one or more inputs into a set of criteria formatted into a query syntax or a structured query language;

execute a scan on the stock within the predicted duration against a database containing real-time quotes and associated trading data to generate a plurality of results;

obtain a list of a plurality of descriptions of trading strategies;

filter the list of the plurality of descriptions of trading strategies using the set of criteria resulting in one or more filtered strategies;

determine whether each result of the plurality of results accords with the one or more filtered strategies;

for each result that accords with the one or more filtered strategies, calculate, based on the criteria, a probability of success, a measure of return, and a measure of risk;

generate a flattened spread reflecting the probability of success, the measure of return, and the measure of risk;

display the flattened spread on a user interface;

generate one or more links based on the displayed flattened spread; and provide the one or more links on the user interface, wherein, for each link of the one or more links, selection of the link by a user launches audio or visual explanations of the flattened spread.

9. The system of claim 8, wherein the instructions, upon execution, cause the at least one processor to:

receive, via the user interface, a trade input from the user related to a selected result of the plurality of results; and initiate a trade on the selected result in accordance with the trade input.

10. The system of claim 8, wherein the instructions, upon execution, cause the at least one processor to:

display on the user interface a series of selectable options to the user, wherein the one or more inputs are received as responses to the series of selectable options; and display, for each selectable option of the series of selectable options, one or more questions with multiple choice answers providing narrative context.

11. The system of claim 8, wherein the instructions, upon execution, cause the at least one processor to:

identify a trading strategy of the plurality of descriptions of trading strategies based on whether the predicted direction for the stock corresponds to a bull put vertical spread, a bear call vertical spread, or an iron condor.

12. The system of claim 8, wherein:
the instructions, upon execution, cause the at least one processor to calculate the probability of success by dividing a measure of real risk by a measure of total risk,
the measure of total risk includes an absolute value based on a width of a spread and a multiplier,
the measure of real risk includes total risk minus a measure of credit received, and
the measure of credit received is based on a market value of the spread.

13. The system of claim 8, wherein:
the instructions, upon execution, cause the at least one processor to calculate the measure of return based on a measure of credit received multiplied by a quantity factor,
the measure of credit received is based on a market value of a spread,
the quantity factor includes a dollar amount associated with the tolerable percentage of potential loss divided by a measure of real risk,
the measure of real risk includes a measure of total risk minus the measure of credit received, and
the measure of total risk includes an absolute value based on a width of a spread and a multiplier.

14. The system of claim 8, wherein:
the instructions, upon execution, cause the at least one processor to calculate the measure of risk based on a measure of real risk multiplied by a quantity factor,
the quantity factor includes a dollar amount associated with the tolerable percentage of potential loss divided by the measure of real risk,
the measure of real risk includes a measure of total risk minus a measure of credit received,
the measure of total risk includes an absolute value based on a width of a spread and a multiplier, and
the measure of credit received is based on a market value of a spread.

15. A non-transitory computer-readable device having instructions stored thereon that, when executed by at least one computing device, cause the at least one computing device to perform operations, the instructions comprising:
providing one or more narrative questions;
receiving one or more inputs in response to the one or more narrative questions, wherein the one or more inputs indicate criteria for a potential trade including: a stock, a predicted direction for the stock, a predicted duration for the predicted direction, a tolerable probability of success, and a tolerable percentage of potential loss from an account;
transforming the one or more inputs into a set of criteria formatted into a query syntax or a structured query language;
executing a scan on the stock within the predicted duration against a database containing real-time quotes and associated trading data to generate a plurality of results;
obtaining a list of a plurality of descriptions of trading strategies;
filtering the list of the plurality of descriptions of trading strategies using the set of criteria resulting in one or more filtered strategies;
determining whether each result of the plurality of results accords with the one or more filtered strategies;
for each result that accords with the one or more filtered strategies, calculating, based on the criteria, a probability of success, a measure of return, and a measure of risk;
generating a flattened spread reflecting the probability of success, the measure of return, and the measure of risk;
displaying the flattened spread on a user interface;
generating one or more links based on the displayed flattened spread; and
providing the one or more links on the user interface, wherein, for each link of the one or more links, selection of the link by a user launches audio or visual explanations of the flattened spread.

16. The non-transitory computer-readable device of claim 15, the instructions further comprising:
receiving, via the user interface, a trade input from the user related to a selected result of the plurality of results; and
initiating a trade on the selected result in accordance with the trade input.

17. The non-transitory computer-readable device of claim 15, the instructions further comprising:
displaying, on the user interface, a series of selectable options to the user, wherein the one or more inputs are received through response to the series of selectable options; and
displaying, for reach selectable option of the series of selectable options, one or more questions with multiple choice answers providing narrative context.

18. The non-transitory computer-readable device of claim 15, wherein:
the instructions further comprise calculating the probability of success by dividing a measure of real risk by a measure of total risk,
the measure of total risk includes an absolute value based on a width of a spread and a multiplier,
the measure of real risk includes total risk minus a measure of credit received, and
the measure of credit received is based on a market value of the spread.

19. The non-transitory computer-readable device of claim 15, wherein:
the instructions further comprise calculating the measure of return based on a measure of credit received multiplied by a quantity factor,
the measure of credit received is based on a market value of a spread,
the quantity factor includes a dollar amount associated with the tolerable percentage of potential loss divided by a measure of real risk,
the measure of real risk includes a measure of total risk minus the measure of credit received, and
the measure of total risk includes an absolute value based on a width of a spread and a multiplier.

20. The non-transitory computer-readable device of claim 15, wherein:
the instructions further comprise calculating the measure of risk based on a measure of real risk multiplied by a quantity factor,
the quantity factor includes a dollar amount associated with the tolerable percentage of potential loss divided by the measure of real risk,
the measure of real risk includes a measure of total risk minus a measure of credit received,
the measure of total risk includes an absolute value based on a width of a spread and a multiplier, and
the measure of credit received is based on a market value of a spread.

* * * * *

UNITED STATES PATENT AND TRADEMARK OFFICE
CERTIFICATE OF CORRECTION

PATENT NO. : 10,540,715 B2  
APPLICATION NO. : 14/101011  
DATED : January 21, 2020  
INVENTOR(S) : Victor Anthony Jones et al.

Page 1 of 1

It is certified that error appears in the above-identified patent and that said Letters Patent is hereby corrected as shown below:

In the Specification

Column 7, Line 12    delete "input?" and insert --input>?--

Column 7, Line 41    delete "208." and insert --108.--

Column 7, Line 42    delete "208" and insert --108--

In the Claims

Claim 17, Column 16, Line 24    delete "reach" and insert --each--

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*